United States Patent
Culbert (10) Patent No.: US 7,982,796 B2
(45) Date of Patent: Jul. 19, 2011

(54) TRACK FOR IMPROVED VIDEO COMPRESSION

(75) Inventor: Michael F. Culbert, Monte Sereno, CA (US)

(73) Assignee: Apple Inc., Cupertino, CA (US)

(*) Notice: Subject to any disclaimer, the term of this patent is extended or adjusted under 35 U.S.C. 154(b) by 2296 days.

(21) Appl. No.: 09/816,290

(22) Filed: Mar. 21, 2001

(65) Prior Publication Data

US 2002/0136294 A1    Sep. 26, 2002

(51) Int. Cl.
*H04N 7/12* (2006.01)
*H04N 11/02* (2006.01)

(52) U.S. Cl. ............... 348/384.1; 375/240.01

(58) Field of Classification Search .......... 348/384.1, 348/387.1, 401.1, 402.1, 409.1, 415.1, 432.1; 375/240.01, 240.03, 240.12, 240.15, 240.24, 375/240.26
See application file for complete search history.

(56) References Cited

U.S. PATENT DOCUMENTS

| | | | |
|---|---|---|---|
| 5,649,171 A * | 7/1997 | Craven et al. ............... 703/23 |
| 5,768,534 A | 6/1998 | Guillotel et al. ......... 395/200.77 |
| 5,802,361 A * | 9/1998 | Wang et al. .................. 382/217 |
| 5,883,672 A * | 3/1999 | Suzuki et al. ............ 375/240.04 |
| 5,903,261 A * | 5/1999 | Walsh et al. ............... 715/500.1 |
| 6,038,256 A * | 3/2000 | Linzer et al. ............. 375/240.12 |
| 6,115,499 A * | 9/2000 | Wang et al. ................... 382/232 |
| 6,195,461 B1 | 2/2001 | Fujita et al. ................... 382/232 |
| 6,233,278 B1 * | 5/2001 | Dieterich ................ 375/240.03 |
| 6,389,224 B2 * | 5/2002 | Mori et al. ................... 386/111 |
| 6,442,331 B1 * | 8/2002 | Watkins ........................ 386/82 |
| 6,452,969 B1 * | 9/2002 | Yim ........................ 375/240.02 |
| 6,459,459 B1 * | 10/2002 | Ratakonda .................... 348/700 |
| 6,462,754 B1 * | 10/2002 | Chakraborty et al. ......... 345/723 |
| 6,507,618 B1 * | 1/2003 | Wee et al. ................ 375/240.16 |
| 6,525,746 B1 * | 2/2003 | Lau et al. ....................... 345/725 |
| 6,671,323 B1 * | 12/2003 | Tahara et al. ............. 375/240.26 |
| 2004/0101041 A1 | 5/2004 | Alexandre et al. |

FOREIGN PATENT DOCUMENTS

| | | |
|---|---|---|
| DE | 19952683 | 8/2000 |
| EP | 0825782 | 2/1998 |
| FR | 2809573 | 11/2001 |
| JP | 8-191450 | 7/1996 |
| JP | 8-265685 | 10/1996 |
| JP | 9-69949 | 3/1997 |
| JP | 9-0168148 | 6/1997 |
| JP | 2000-013737 | 1/2000 |
| JP | 2000-102007 | 4/2000 |
| JP | 2000-152243 | 5/2000 |
| JP | 2000-253351 | 9/2000 |
| JP | 2001-25024 | 1/2001 |
| KR | 2000-31029 A1 | 5/2000 |

OTHER PUBLICATIONS

PCT International Search Report, date mailed Jun. 17, 2002.
KIPO Notification of Provisional Rejection dated Sep. 29, 2005.
International Communication dated Jun. 3, 2005 from corresponding International Application No. 02 728 445.4-2223.
Japanese Office Action dated February 6, 2007, from corresponding Japanese Application No. 2002-576447 (English Translation Enclosed).
Japanese Office Action dated Apr. 18, 2010 from Japanese Patent Application No. 2002-576447.

* cited by examiner

*Primary Examiner* — David Czekaj
(74) *Attorney, Agent, or Firm* — Beyer Law Group LLP (57) ABSTRACT

A computer readable medium for compressing video data with an edit track is provided. Generally, computer readable code for compressing video data is provided. The computer readable code for compressing comprises computer readable code for accessing the edit track to use data in the edit track during the compressing the video data.

19 Claims, 10 Drawing Sheets

TRACK FOR IMPROVED VIDEO COMPRESSION

FIELD OF THE INVENTION

The present invention relates generally to computer systems. More particularly, the present invention relates to providing improved video compression for computer systems.

BACKGROUND OF THE INVENTION

Computer systems are used in editing video data. Computer systems are also used to compress the video data. The Moving Picture Experts Group (MPEG) has provided the video compression standards MPEG-1, MPEG-2, and MPEG-4. MPEG-1 is a standard for storage and retrieval of moving pictures and audio on storage media. MPEG-2 is a standard for compression of video for products such as Digital Television and DVD's. MPEG-4 is a standard for multimedia for the web. Such compression processes generally cause the loss of some video quality in order to achieve the desired video compression.

The processes used for compressing video data under MPEG-2 cause video compression of video data edited with certain special effects to take longer to compress than video data without certain special effects and which may result in a poorer quality compressed video. Generally, processes used to compress video data under MPEG-2 require the use of a compression algorithm to compress the video data. The compressed video data may then be uncompressed and compared with the original video data. If the error between the resulting video data and the original video data is too large, the algorithm is adjusted or another algorithm is used to compress the video data. The error is then again checked until an algorithm is found that provides a satisfactory error. Such iterative processes of trying different algorithms to obtain an acceptable error takes a large amount of processing time and reduces video quality. Such a process using a 733 MHz Power Mac G4™ by Apple Computer of Inc.™ of Cupertino Calif. with 8 Gigaflops may require two times real time for video compressing, i.e. 60 minutes to compress a 30 minute movie.

It would be desirable to provide a computer system which is able to provide video compression at a higher speed or which is able to produce a higher quality and improved video compression.

SUMMARY OF THE INVENTION

To achieve the foregoing and other objects and in accordance with the purpose of the present invention, a method of compressing video data with an edit track is provided. Generally, video data is compressed. The compressing comprises accessing the edit track to use data in the edit track during the compressing.

In an alternative embodiment a computer readable medium for compressing video data with an edit track is provided. Generally, computer readable code for compressing video data is provided. The computer readable code for compressing comprises computer readable code for accessing the edit track to use data in the edit track during the compressing.

In an alternative embodiment a system for compressing video data is provided. An edit track reader accesses data within the edit track and generates instructions based on the data within the data track. A video compressor receives instruction from the edit track reader and receives the edited video track and audio track, and compresses the edited video according to the instructions from the edit track reader.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well-known process steps and/or structures have not been described in detail in order to not unnecessarily obscure the present invention.

Figure 1A:
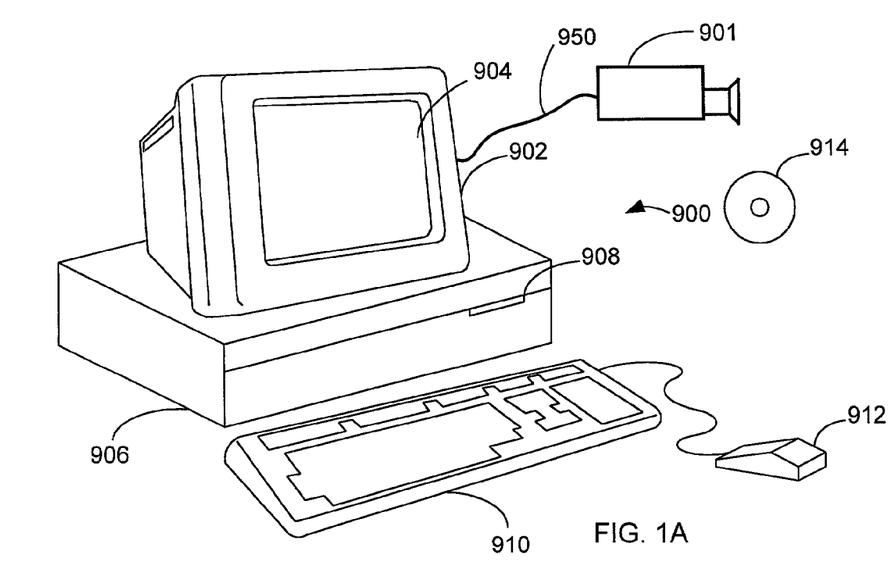
FIGS. 1A and 1B illustrate a computer system connected to a camcorder, which is suitable for implementing embodiments of the present invention.
Figure 1B:
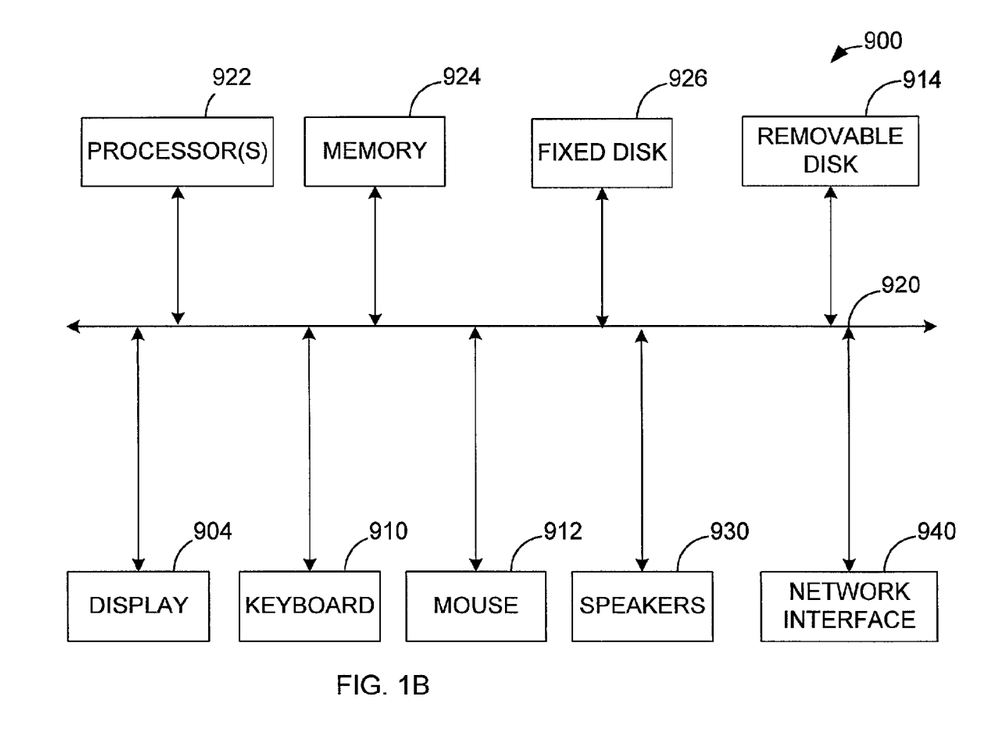

To facilitate discussion, FIGS. 1A and 1B illustrate a computer system 900 connected to a camcorder, which is suitable for implementing embodiments of the present invention. FIG. 1A shows one possible physical form of the computer system 900 connected to a camcorder 901. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 1B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and DVDs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Figure 2:
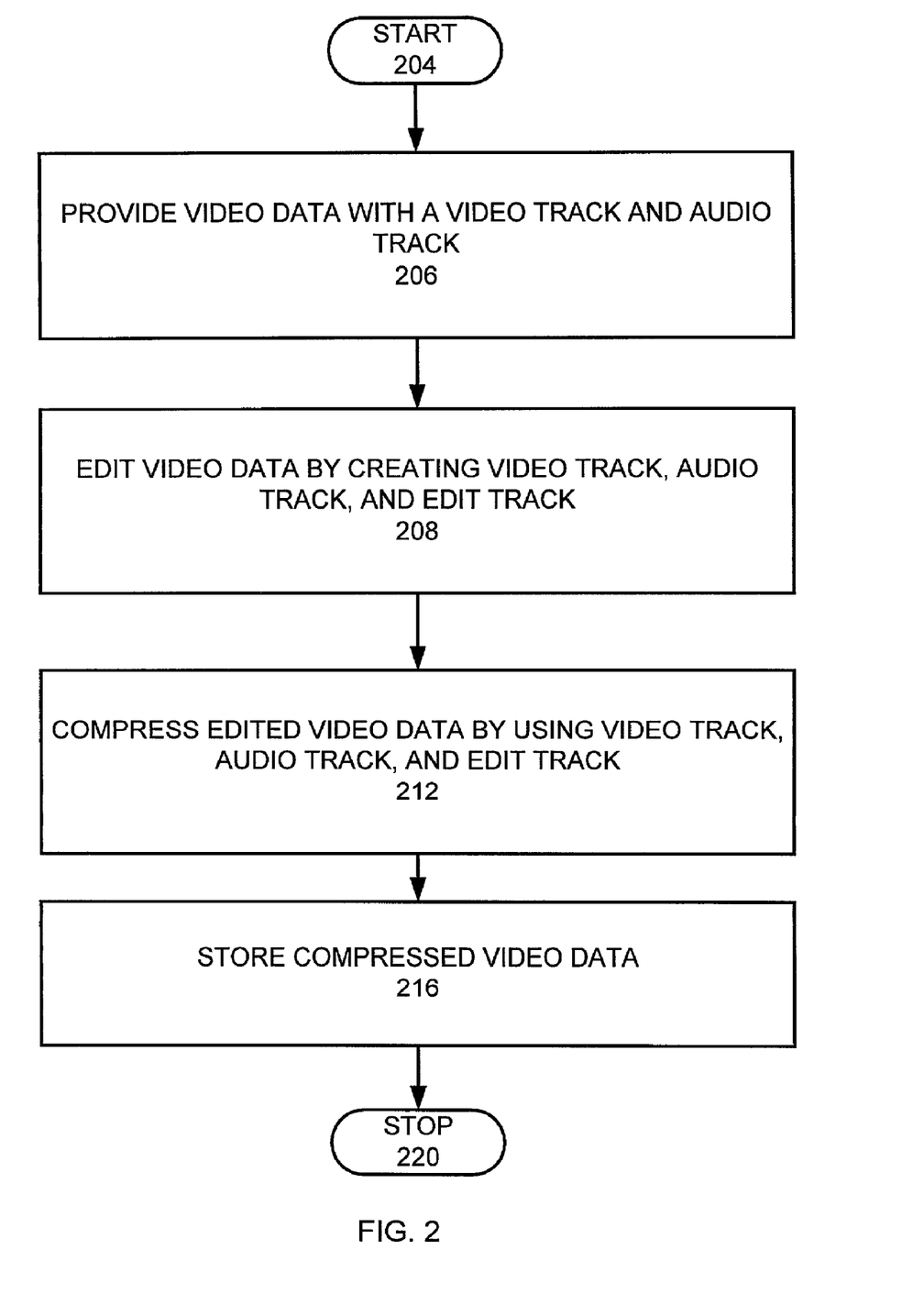
FIG. 2 is a high level flow chart of a process that uses the invention.

To facilitate discussion, FIG. 2 is a high level flow chart of a process that uses the invention. First, video data is provided to the computer system 900 (step 206). The video data may be a video and audio track recorded by a camcorder or recorded on a VCR from a television broadcast. Such video data may be transferred from the camcorder 901 or a VCR to the computer system 900 by a connection 950, such as a Firewire™ (also known as IEEE 1394) connection or may be connected through a media converter. The video data may be saved on storage media accessible by the computer system 900. Such video data may only have a video track and audio track and may be stored in a format such as the digital video (DV) format.

Next the video data is edited, creating a video track, an audio track, and an edit track (step 208). A video editing software, such as iMovie™ or Final Cut Pro™ which are both from Apple Computer Inc.™, may be used to edit video data.

Such video editing software may allow a user to use editing techniques to provide video effects such as, but not limited to, adding text to video, performing blends, provide color correction, perform a video overlay, provide edge effects, add transitions, adding chroma-key (blue screening), performing a static image blend, and performing a static image overlay. Each editing step of the video data creates data stored in an edit track, which records the editing step. Conventional editing software may need to be modified to store data in the edit track in a manner so that the edit track is accessible to the compression software. The editing software also stores the edited video data in a video track and an audio track.

Next the edited video data is compressed by the computer system (step 212). Compression software, which may be stored on the computer system 900, accesses the video track, audio track, and edit track to use information in the video track, audio track and edit track to compress the video data. In the preferred embodiment, the video data is compressed to an MPEG format. More preferably, the video data is compressed to an MPEG-2 format.

The compressed video data may then be stored (step 216). In the preferred embodiment, the compressed video data is stored on a DVD disk so that it may be displayed using a DVD player. However, other media storage methods and display methods may be used.

Figure 3:
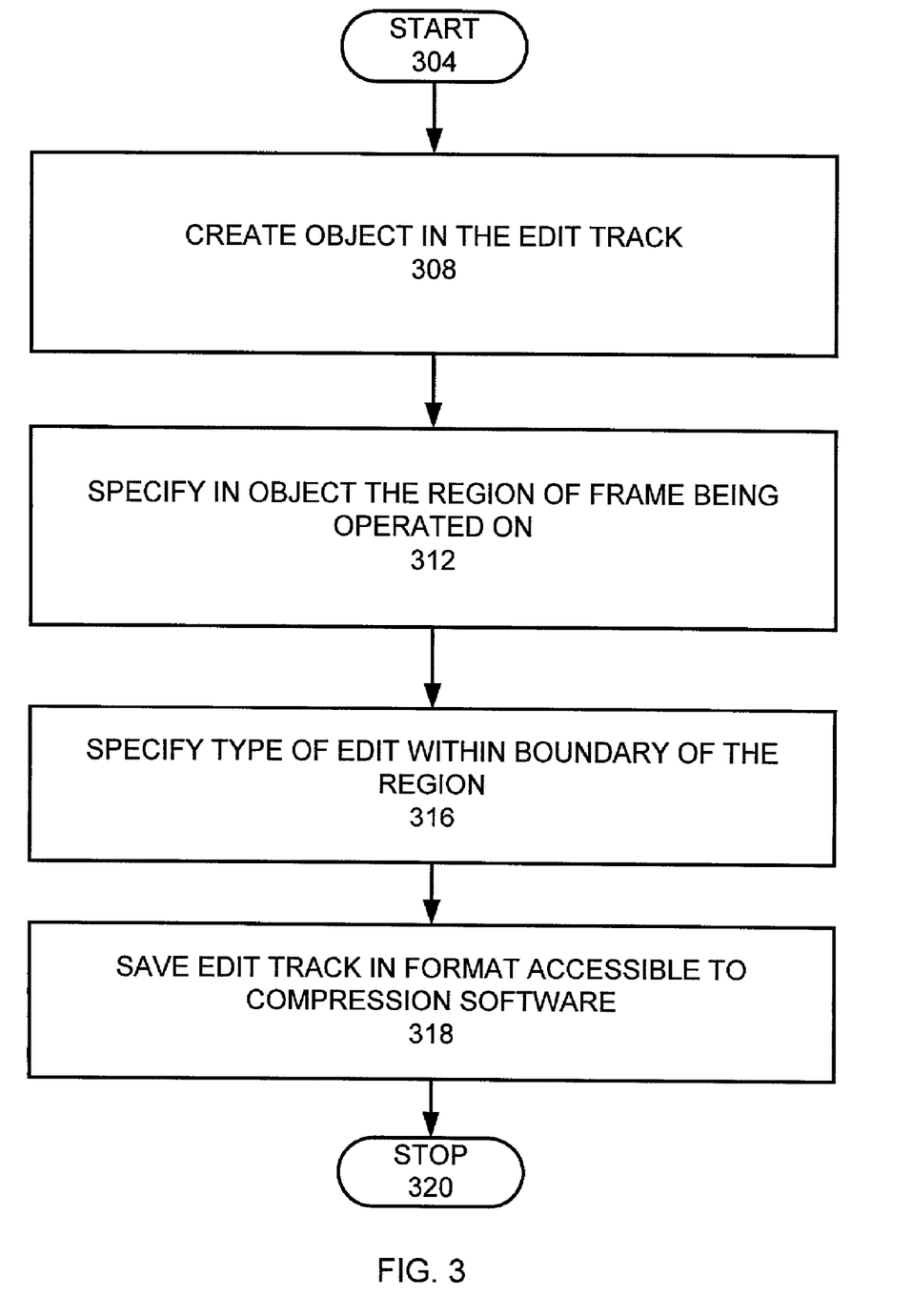
FIG. 3 is a more detailed flow chart of an example of an video editing process that may occur during the edit video data step

FIG. 3 is a more detailed flow chart of an example of an video editing process that may occur during the edit video data step (step 212). Although these steps are described in a chronological manner, these steps my occur in different orders or may occur simultaneously. For each edit of the video performed by the editing software, edit video data in the form of an object, such as a record, is placed in the data track (step 308). In each object a region of the frame being operated on is specified (step 312). The region is an array that specifies boundary points defining an arbitrary shape in which the editing occurs. The type of edit happening in the boundary is also specified (step 316). The edit track is saved in a format so that the object is accessible to the compression software (step 318).

Figure 4:
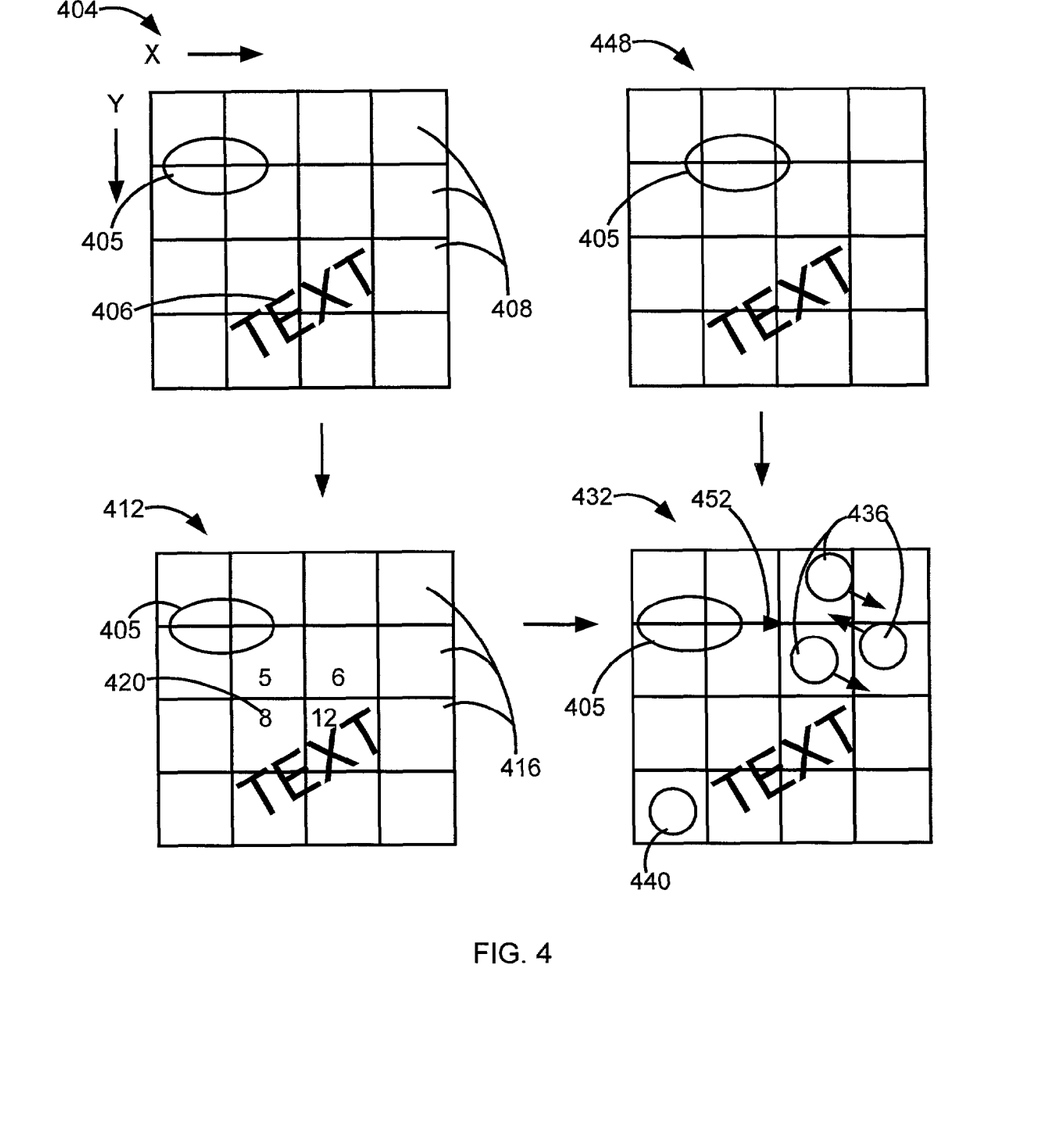
FIG. 4 is an schematic illustration of an example of edited video data and resulting compressed video data.

FIG. 4 is an schematic illustration of an example of edited video data and resulting compressed video data. A frame of video data 404 comprises pixels in the x direction andey direction. An object may be created for a video over lay 405 (step 308). A region forming an oval as illustrated in FIG. 4 is specified in the object for the video overlay (step 312). An effect, such as placing a video insert and having the oval move is specified to occur within the oval boundary (step 316). The object is then saved in the edit track so that it is accessible to the compression software (step 318). An object may also be created for added text 406. A region forming the outline of the word "TEXT" 406 may be specified in the object (step 312). An effect, such as specifying that the text font is Times 24 point in black with antialiasing is also specified within the defined region (step 316). The added text object is also saved on the edit track in a format that is accessible to the compression software (step 318) through the output product of the editing software.

Figure 5:
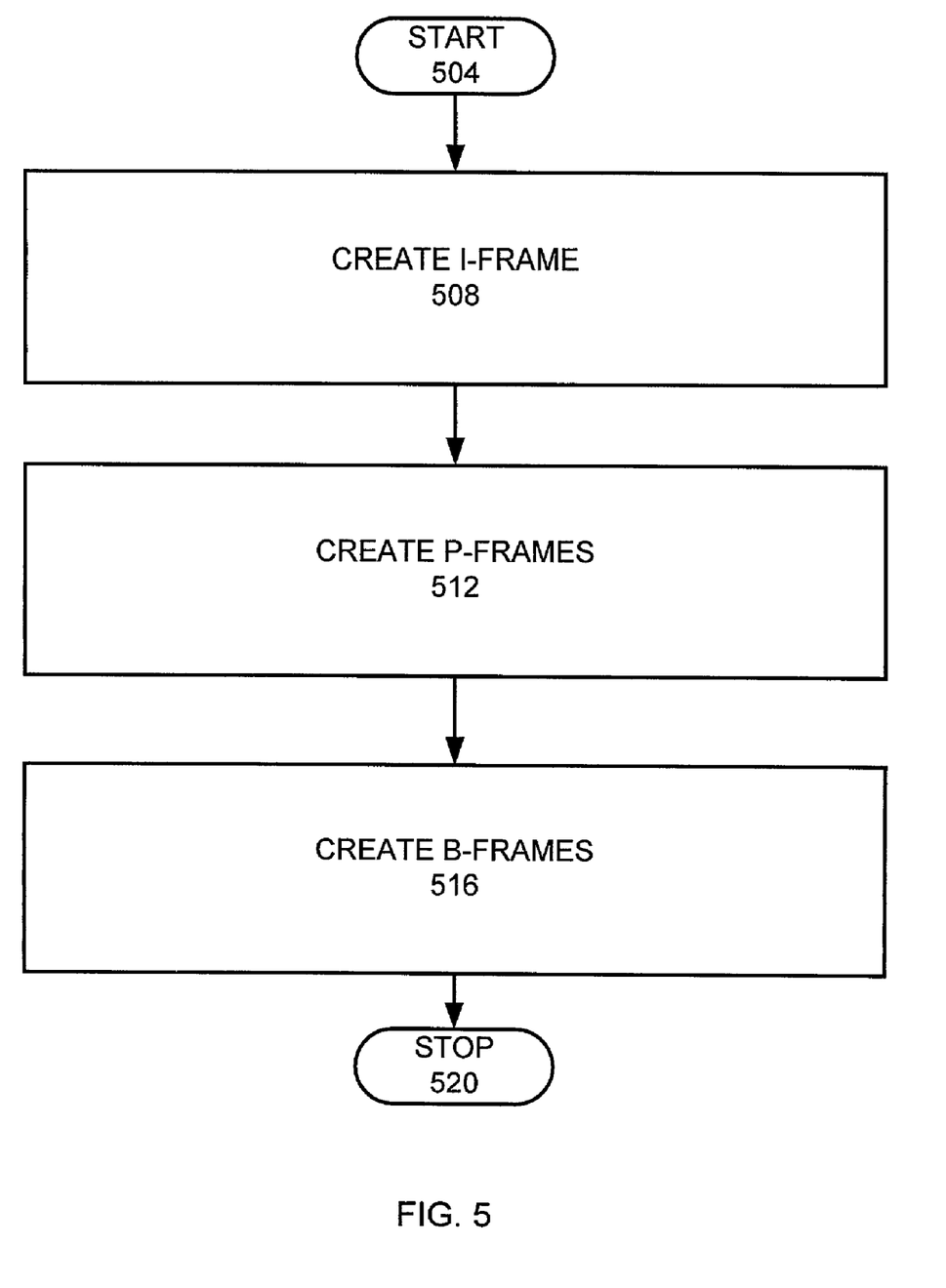
FIG. 5 is a more detailed flow chart of an example of an example of the video compression step.

FIG. 5 is a more detailed flow chart of an example of an example of the video compression step (step 212). First an intra code frame (I-frame) 412 may be generated from the edited video data frame 404 (step 508). The I-frame 412 is called an intra coded frame, since the original frame may be reconstructed from the I-frame, without other frames. MPEG-2 performs this conversion with a discrete cosine transform (DCT) and other compression processes. For the discrete cosine transform the pixels in the frame 404 are divided into blocks 408. The intensity and position of the pixels in each block are transferred to the I-frame 412, where intensity and position of the pixels in a block are converted to an array of frequencies and times in a block 416 using discrete cosine transform. DCT transforms a block of pixel intensities into a block of frequency transform coefficients. The transform is then applied to new blocks until the entire image is transformed. Part of the process of compressing the data is implemented by dithering by allowing a single frequency value 420 to represent a group of pixels. During the during the creation of the I-frame the compression software may access the edit track to determine the number of bits that should be used for quantization, which is the number of bits that are allocated to represent this part of the compressed image.

Next a forward predicted frame (P-frame) 432 is generated from a subsequent frame of video data 448 and the I-frame 412 (step 512). In general P-frames are predicted from previous I-frames or previous predicted frames. These predictions may take two forms, motion vectors, and difference vectors. Motion vectors 436 indicate that a point moved from one place to another. Difference vectors 440 indicate how a point has changed. Such forward predicted frames are decoded by applying the difference vectors and motion vectors to an I-frame and then performing a decompression and inverse DCT to generate a frame of video data. Algorithms for generating predictive motion vectors and difference vectors may cause substantial errors due to mispredictions. Due to the nature of edits the greatest errors may be a result of edited features in edited regions. Therefore, the inventive compression software accesses edit information in the edit track in forming predictive motion vectors and difference vectors. The use of edit information transforms the edited regions from locations where the greatest predictive errors may occur to regions where it may be possible to have no predictive errors, since in some cases no prediction may be required, since motion or differences between frames may be specified by the edit object.

Next a B-frame may be created from the edited video data, the I-frame and the P-frame (step 516). B-frames, both forward predicted and backward predicted from the last/next I-frame or P-frame, are also specified under MPEG-2. B-frames are inter coded frames and require two other frames to reconstruct the video data. Difference vectors and motion vectors are also used to predict the B-frame from P-frames and I-frames. For this reason information in the edit track would also be useful for more quickly generating B-frames with less error.

The use of motion vectors and difference vectors to create P-frames and B-frames allow for a dramatic reduction in data size for increased compression. The problem with using such motion and difference vectors to compress data is that mistakes in predictions may be made. As CPU time to process such compressions is increased the quality of the resulting video compression is increased.

Figure 6:
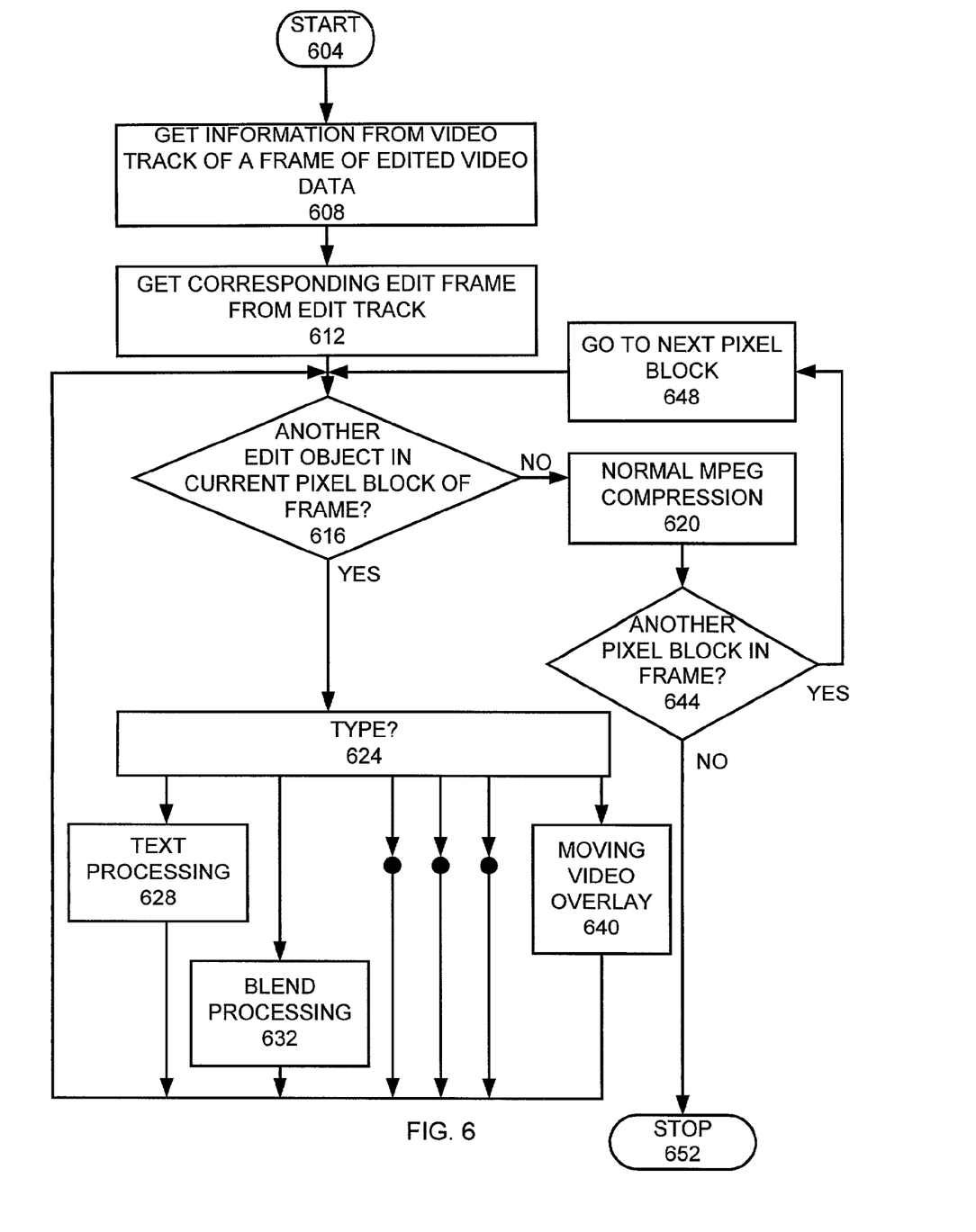
FIG. 6 is a more detailed flow chart for encoding frames into a compressed format such as MPEG-2.

FIG. 6 is a more detailed flow chart for encoding frames into a compressed format such as MPEG-2, which may be used for steps 508, 512, and 516. For a block in a frame of edited video, information from the video track of the frame of edited video data is accessed (step 608). A corresponding record for the video frame in the edit track (edit frame) is accessed (step 612). The edit frame is checked to see if there is an edit object at the current pixel block (step 616). If there is no edit object at the current pixel block, normal MPEG compression is used on the current pixel block (step 620) and then the process proceeds to the next pixel block (step 648) or stops if there is no other pixel block (step 652). If there is an edit object in the pixel block the type of edit object is identified (step 624). There are many possible types of edit objects.

As mentioned above some of the possible edit objects may be, but are not limited to, adding rendered text to video, performing blends of two different streams of video, providing color correction, performing a video overlay, providing edge effects, adding transitions, adding chroma-key (blue screening), performing a static image blend, and performing a static image overlay. When the edit object type is identified, an edit processing step is implemented according to the edit object type. The example edit processing steps related to edit object types specifically shown in FIG. 6 are adding text which proceeds to a text processing step (step 628), blending which proceeds to a blend processing step (step 632), and moving video overlays which proceeds to a moving video overlay step (step 640). Although in the example shown in FIG. 6 adding text, blending, and moving video overlays are specifically illustrated the dot's indicate that any number of additional editing object types may be added. After the edit processing step is completed the pixel block is searched to see if there is another edit object within the pixel block (step 616). If there is another edit object in the pixel block it is processed as described above. If there is no other edit object in the pixel block, then a normal MPEG compression of the pixel block is accomplished (step 644) and then the process proceeds to the next pixel block (step 648) or stops if there is no other pixel block (step 652).

Figure 7:
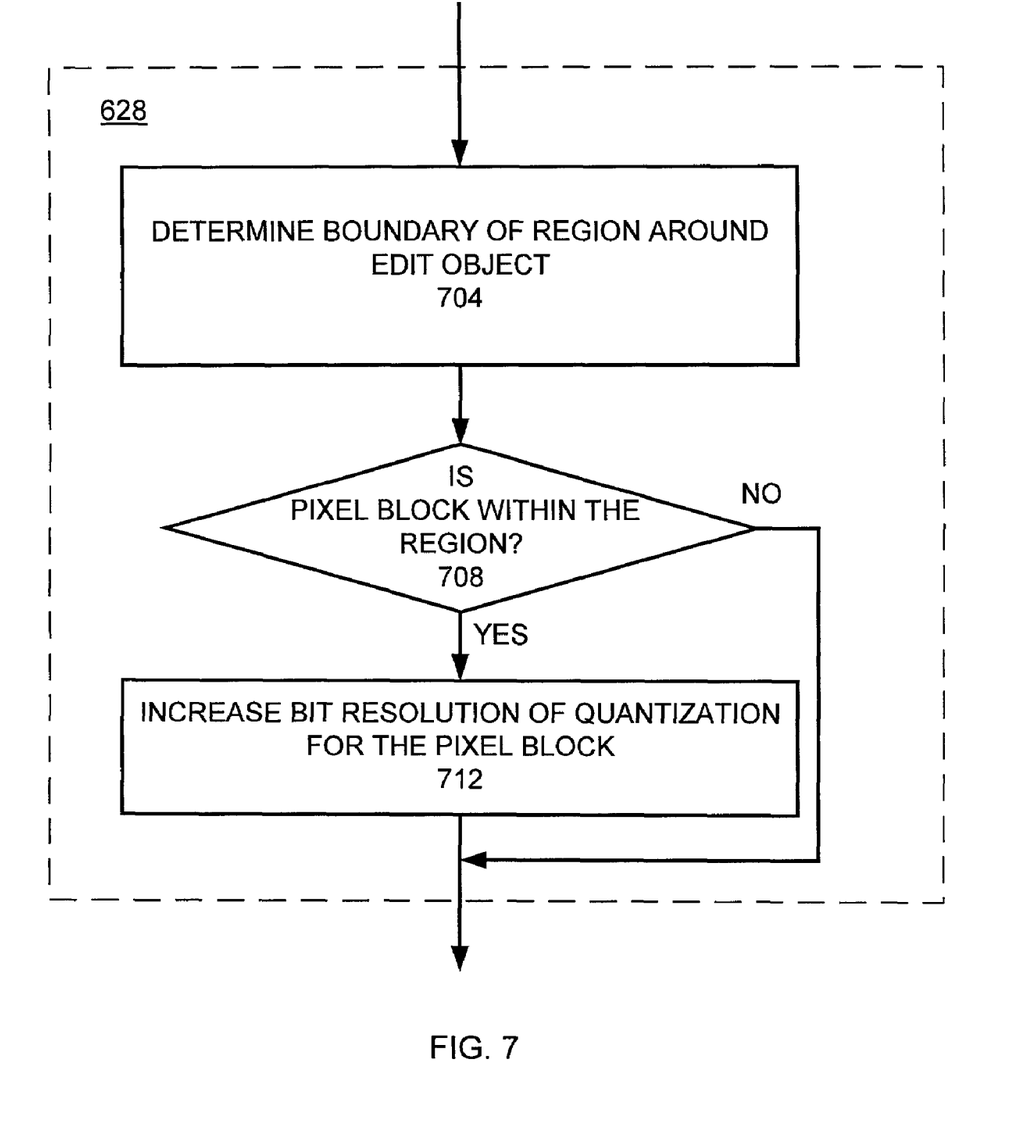
FIG. 7 is a more detailed flow chart of the text processing step.

FIG. 7 is a more detailed flow chart of the text processing step (step 628). A determination is made of the boundary region around the edit object (step 704). A determination is then made on whether the pixel block is within the boundary region around the edit object (step 708). This step determines whether the pixel block contains only part of a border of the boundary region or whether part of the edit object within the boundary region is within the pixel block. If part of the edit object within the boundary region is within the pixel block, then the bit resolution of quantization is increased for the pixel block (step 712). The bit resolution of quantization is increased by increasing the number of bits used to represent the pixel block in the compressed image. By increasing the bit resolution of quantization for the current pixel block, improved resolution for text is provided by allowing the text to stand out from the video, while avoiding some of the current trial and error techniques that would need to perform several encode and decode cycles before determining that bit resolution of quantization for the current pixel block should be increased or may fail to recognize the text and fail to increase the resolution of quantization. For large text, the bit resolution quantization may be increased around the edges of the text and decreased in the center of the text.

Figure 8:
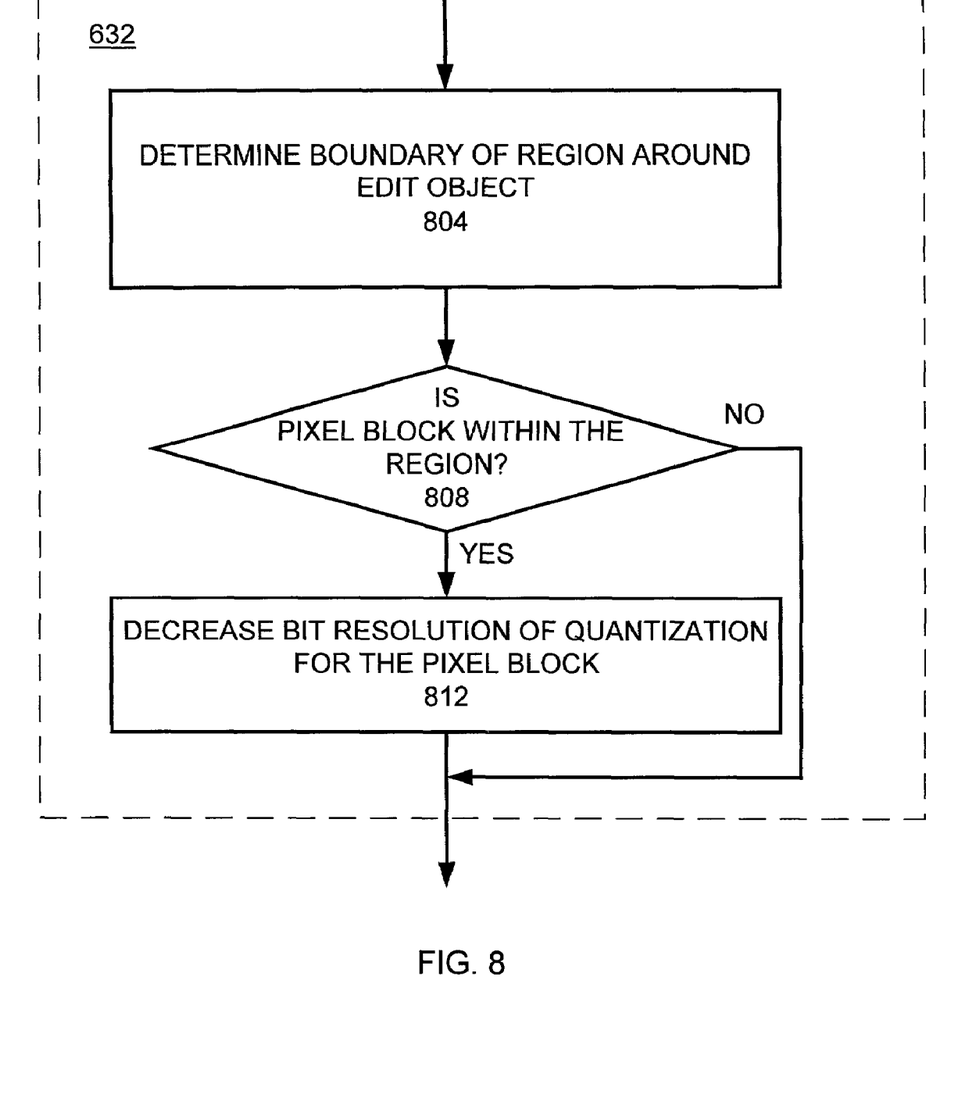
FIG. 8 is a more detailed flow chart of the blend processing step.

FIG. 8 is a more detailed flow chart of the blend processing step (step 632). A determination is made of the boundary region around the edit object (step 804). A determination is then made on whether the pixel block is within the boundary region around the edit object (step 808). This step determines whether the pixel block contains only part of a border of the boundary region or whether part of the edit object within the boundary region is within the pixel block. If part of the edit object within the boundary region is within the pixel block, then the bit resolution of quantization is decreased for the pixel block (step 812). The bit resolution of quantization is decreased by decreasing the number of bits used to represent the pixel block. By decreasing the bit resolution of quantization for the current pixel block, resolution is decreased allowing for a blending, while avoiding some of the current trial and error techniques that would need to perform several encode and decode cycles before determining that bit resolution of quantization for the current pixel block should be decreased or may fail to recognize the blend and fail to decrease the resolution of quantization.

Figure 9:
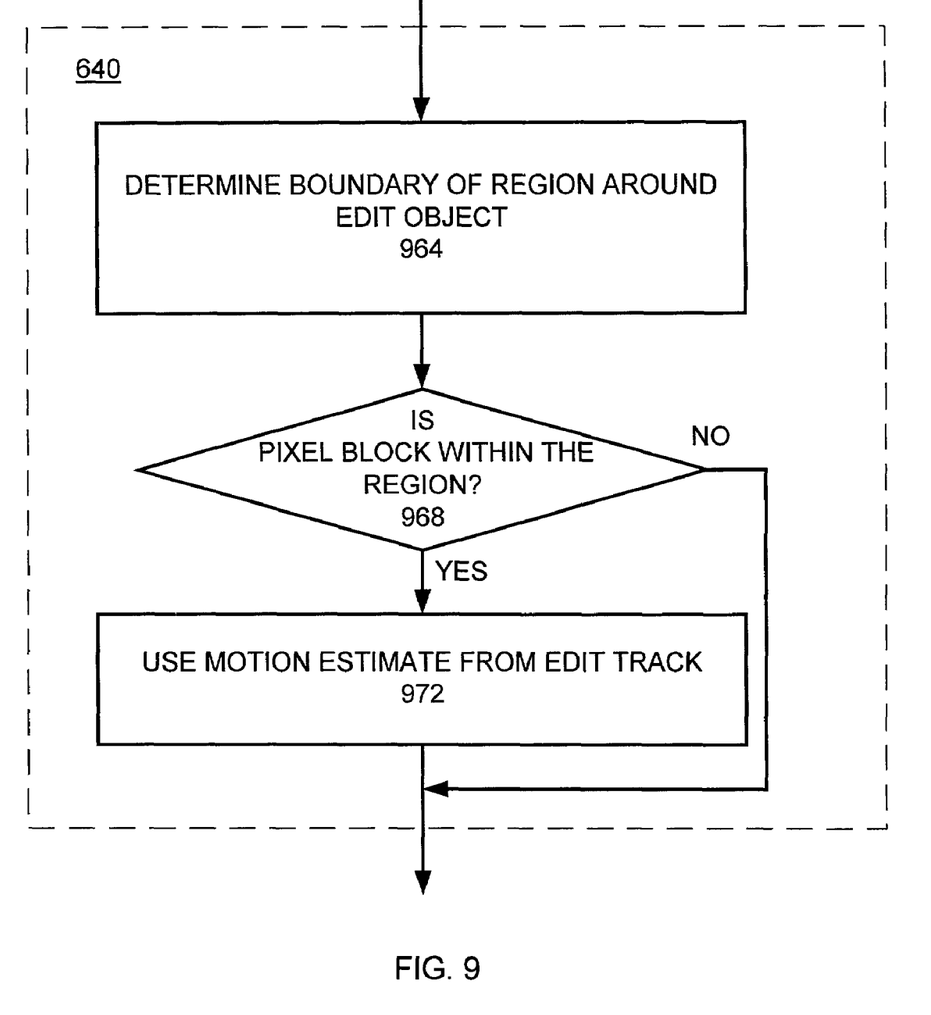
FIG. 9 is a more detailed flow chart of the moving video overlay processing step.

FIG. 9 is a more detailed flow chart of the moving video overlay processing step (step 640). A determination is made of the boundary region around the edit object (step 964). A determination is then made on whether the pixel block is within the boundary region around the edit object (step 968). This step determines whether the pixel block contains only part of a border of the boundary region or whether part of the edit object within the boundary region is within the pixel block. If part of the edit object within the boundary region is within the pixel block, then a motion vector is derived from motion information in the edit object (step 972). Video overlay 405 in FIG. 4 is an example of a moving video overlay. Between the video frame 404 and the subsequent video frame 448, video overlay 405 moves to the right, as shown. I-frame 412 provides the video overlay 405. To generate the P-frame 432, the edit track is accessed and it is found that a moving video overlay 405 has been added to the video frames 404, 448. From this a motion vector 452 is added to the P-frame (step 912). A changing video image may be inserted in the video overlay 405. The edit object for the video overlay would indicate that a changing video image is inserted in the video overlay, so that a compression may be performed on the region within the video overlay 405. By accessing the edit object, the compression program can automatically generate an exact motion vector of exactly the size of the video overlay and also know that a video compression should be done, possibly separately, on the region within the video overlay. This allows for a more accurate and quicker compression than the process of by trial and error determining the motion and area of the video overlay and determining that a separate video image is occurring within the video overlay. Video overlays may change size and shape, which may be recorded in the edit track.

In other edit types other corrections may be provided. For color correction, where part of a video image is color corrected the color correction may remove some of the color detail. Subsequent compression may change the dynamic range of the color corrected image so that the resulting image looks flat. Although color correction before compression may look satisfactory, compression may make the color corrected image unacceptable. The invention may increase the resolution of quantization for the area where color correction has occurred to provide a more accurate frequency constant over smaller areas of the image.

For providing edge effects an edge may be provided around an overlay or other object. An example is the use of an edge effect on text to create embossed text. For edge effects, the invention may raise the resolution only around the edge of the region for the edge effect.

There are many various transitions, which may be used to replace one video clip with another. The type of processing provided by the invention depends on the type of transition. For a page turn type of transition the invention may require more I-frames. In such a page turn type of transition pixels from one video disappear as they are replaced by images from another video during the peal of the page turn transition. Since the pixels are being replaced by another image, motion and difference prediction vectors may not account for such a transition. A compression algorithm by itself would not know this and through trial and error would try different motion and difference algorithms to try and predict a P-frame. The invention would use the edit track to tell the compression engine to not try to predict, but instead to generate more I-frames from the edited video data.

Figure 10:
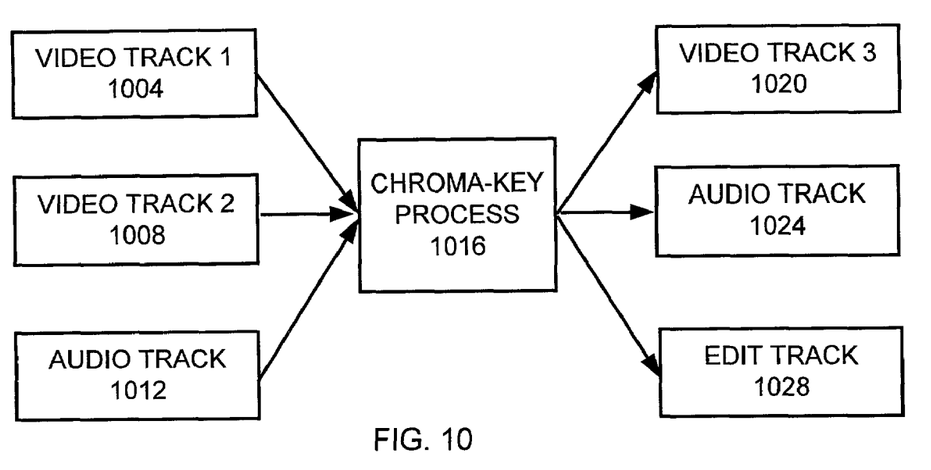
FIG. 10 is a schematic view of an embodiment of the inventive chroma-key process.

Chroma-keying is a process of allowing a color in a first video image to be replaced with a second video image. Often a blue screen is used as a background and the blue color from the blue screen is filled with the second video image, which is also called blue screening. In the reporting of weather, it is common to have a weather person standing in front of a blue screen. A second video of various maps may be used to fill in the blue from the blue screen behind the weather person in the first video. Some of the light from the blue screen may leak onto the weather person, creating an edge effect around the weather person, which causes a blended region around the weather person. Compression programs see this blended region as an edge and may try to provide increased resolution around this blended region, where it may be more desirable to decrease resolution, so that such a blended region is not noticeable. The invention would provide instructions to cause the edge between two chroma-key images to have lower resolution during compression by reducing the number of bits used to represent pixel blocks around the edge to allow a better blending between images. To accomplish such a blend, the editing software would record the boundary between the images in the edit track. FIG. 10 is a schematic view of an embodiment of the inventive chroma-key process. Video track 1 1004 and video track 2 1008 and an audio track 1012 are provided to the chroma-key process 1016. The audio track 1012 may be an audio track to video track 1 1004, video track 2 1008, another source or some combination. The chroma-key process combines video track 1 1004 with video track 2 1008 to create video track 3 1020. The input audio track 1012 may remain unchanged to form the output audio track 1024. An edit object is placed in an edit track 1028. The edit object may define the boundary between the video images of video track 1 1004 and video track 2 1008 and an identifier to identify the edit object as a chroma-key process. Although blue is used as the key color in the above example, chroma-key may use any color as the key color.

A static image blend uses a static image, such as a colored picture, which is blended into part of a video image, so that the static image and the part of the video image may be seen at the same location at the same time. Since the static image is static, it does not move. Therefore the invention tells the video compressor to predict no movement of the static image. This allows the video compressor to determine that the image is static, without trial and error encoding and decoding.

A static image overlay is the placing of an image over part of the video image, so that the part of the video image over which the static image is placed cannot be seen. The static image may be panned and zoomed, but may be otherwise static. The entire static image may be represented by a single motion vector. Knowing that the entire static image may be represented by a single motion vector allows a video compressor to provide a much faster and more accurate and compact compression. The video compressor may also be instructed to use more bits in the quantization, since it is more desirable to have a higher resolution static image, while using less bits for the motion vector.

Figure 11:
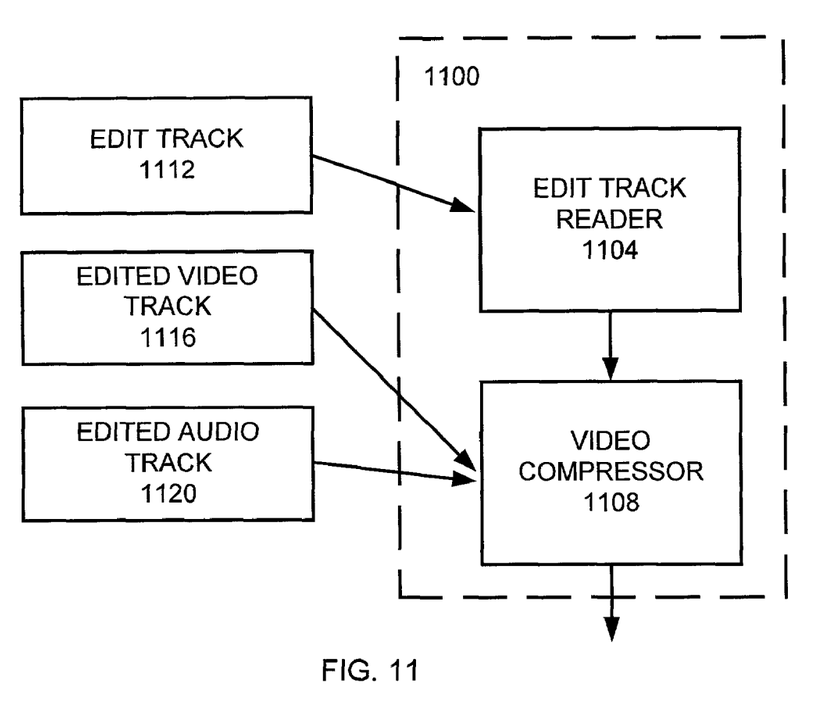
FIG. 11 is a schematic illustration of compression system that may be used in an embodiment of the invention.

The invention may be implemented through software using only the CPU for processing or may use dedicated chips or other combinations. FIG. 11 is an schematic illustration of compression system 1100 that may be used in an embodiment of the invention. An edit track reader 1104 receives edit information from the edit track 1112, and processes the information to provide instructions to a video compressor 1108. The video compressor receives data from the edited video track 1116 and edited audio track 1120 and compresses the data from the edited video track 1116 and edited audio track 1120 according to the instructions from the edit track reader 1104.

In a preferred implementation of the invention, no trial and error is required in providing an MPEG-2 compression. Instead of the conventional MPEG-2 encoding and then decoding to determine if the compression algorithm used provides a sufficiently accurate compression, the preferred embodiment of the invention uses the edit track to provide instructions for an MPEG-2 compression which is reliable enough to not need a subsequent decoding to determine if the compression algorithm is sufficiently accurate. Therefore, the preferred embodiment is able to provide an MPEG-2 compression in with a single encoding, instead of multiple trial and error encodings and decodings.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A computer readable medium containing program instructions for compressing video data with an edit track, the edit track arranged to store edit information corresponding to an edit of the video data, the computer readable medium comprising computer readable code for compressing the video data, wherein the computer readable code for compressing comprises computer readable code for accessing the edit information in the edit track during the compressing, wherein the edit information specifies a motion vector and a difference vector between frames corresponding to the edit, wherein the edit track records editing steps made by a user using video editing software and wherein the recorded editing steps made by a user using video editing software in the edit track are used to adjust compression parameters for compressing the video data by using the specified motion vector and the specified difference vector to eliminate a prediction operation and associated predictive error during the compression for an edited region of the video data corresponding to the edit.

2. The computer readable medium, as recited in claim 1, wherein the computer readable code for compressing of the video data further comprises computer readable code for using information in the edit track to determine the bit resolution of quantization for the edited region.

3. The computer readable medium, as recited in claim 2, wherein the compression is MPEG based compression and wherein the computer readable code for compressing of the video data further comprises computer readable code for using motion information in the edit track to create a forward predicted motion vector and a backward predicted motion vector associated with the edited region.

4. The computer readable medium, as recited in claim 3, wherein the computer readable code for compressing of the video data further comprises computer readable code for using information in the edit track to create a predictive difference vector corresponding to the edited region, wherein the predictive difference vector, the forward and backward predicted motion vectors are used to predict a B-frame from a P-frame and an I-frame resulting in the substantially reduced prediction error.

5. The computer readable medium, as recited in claim 4, wherein the computer readable code for compressing of the video data further comprises computer readable code for using information in the edit track to determine a number of I-frames that will be used for compression.

6. The computer readable medium, as recited in claim 5, further comprising computer readable code for editing video data, comprising:
   computer readable code to allow a user to edit video data to provide video effects;
   computer readable code for creating a video track of edited video data; and
   computer readable code for creating at least one edit object in the edit track, wherein the edit object defines the edit region and a type of edit and where the edited video data records editing steps by the user.

7. The computer readable medium, as recited in claim 1, wherein the computer readable code for compressing of the video data further comprises computer readable code for using text information in the edit track to increase bit resolution of quantization of a pixel block in the compressed video data to improve resolution of text provided by the text information.

8. The computer readable medium, as recited in claim 1, wherein the computer readable code for compressing of the video data further comprises computer readable code for using blend information in the edit track to decrease bit resolution of quantization of a pixel block.

9. The computer readable medium, as recited in claim 1, wherein the edit track specifies a region within which a video edit has occurred and the type of edit that occurred within the region.

10. A method of compressing video data with an edit track arranged to store edit information corresponding to an edit of the video data by recording video editing steps made by a user, the method comprising:
    accessing the edit information in the edit track during the compressing;
    providing at least a specific motion vector and a specific difference vector corresponding to the edit in the edit information; and
    using the specified motion vector and the specified difference vector to eliminate a prediction operation and associated predictive error during the compression for an edited region of the video data corresponding to the edit.

11. The method, as recited in claim 10, wherein the compressing of the video data further comprises using information in the edit track to determine the bit resolution of quantization for the edited region.

12. The method, as recited in claim 11, wherein the compression is MPEG based compression and wherein the compressing of the video data further comprises using motion information in the edit track to create a forward predicted motion vector and a backward predicted motion vector associated with the edited region.

13. The method, as recited in claim 12, wherein the compressing of the video data further comprises using information in the edit track to create a predictive difference vector corresponding to the edited region, wherein the predictive difference vector, the forward and backward predicted motion vectors are used to predict a B-frame from a P-frame and an I-frame resulting in the substantially reduced prediction error.

14. The method, as recited in claim 13, wherein the compressing of the video data further comprises using information in the edit track to determine a number of I-frames that will be used for compression.

15. The system, as recited in claim 13, wherein the video compressor is able to provide video compression with a single encoding.

16. A system for compressing video data with an edited video track, an audio track, and an edit track, comprising:
- an edit track reader for accessing data within the edit track and generating instructions based on the data within the edit track; and
- a video compressor, which receives instruction from the edit track reader and receives the edited video track and audio track, and which compresses the edited video according to the instructions from the edit track reader, wherein the edit track records editing steps made by a user using video editing software and wherein the recorded editing steps made by a user using video editing software in the edit track are used to adjust compression parameters for compressing the video data by accessing information in the edit track during the compressing, providing at least a specific motion vector and a specific difference vector corresponding to the edit in the edit information, and using the specified motion vector and the specified difference vector to eliminate a prediction operation and associated predictive error during the compression for an edited region of the video data corresponding to the edit.

17. The system, as recited in claim 16, wherein the video compressor is an MPEG video compressor, which compresses the video data into an MPEG format.

18. The system, as recited in claim 16, wherein the video compressor is an MPEG-2 video compressor, which compresses the video data into an MPEG-2 format.

19. The system, as recited in claim 18, wherein the video compressor is able to provide video compression with a single encoding.

* * * * *